(12) United States Patent
Ino et al.

(10) Patent No.: US 7,104,283 B2
(45) Date of Patent: Sep. 12, 2006

(54) NORMALLY OPEN HYDRAULIC CONTROL VALVE

(75) Inventors: Tohru Ino, Miyagi (JP); Shigeto Ryuen, Miyagi (JP); Hidetoshi Watanabe, Miyagi (JP); Satoshi Noda, Miyagi (JP)

(73) Assignee: Keihin Corporation, Tokyo (JP)

( * ) Notice: Subject to any disclaimer, the term of this patent is extended or adjusted under 35 U.S.C. 154(b) by 63 days.

(21) Appl. No.: 10/963,748

(22) Filed: Oct. 14, 2004

(65) Prior Publication Data
US 2005/0133098 A1 Jun. 23, 2005

(30) Foreign Application Priority Data
Oct. 15, 2003 (JP) ............................. 2003-354657

(51) Int. Cl.
*F16K 31/06* (2006.01)
(52) U.S. Cl. .................... 137/625.65; 137/625.69; 251/50; 251/53; 251/129.03
(58) Field of Classification Search ........... 137/625.65, 137/625.69; 251/50, 53
See application file for complete search history.

(56) References Cited

U.S. PATENT DOCUMENTS

| | | | | |
|---|---|---|---|---|
| 3,212,522 A | * | 10/1965 | Williams | 137/596.12 |
| 4,122,868 A | * | 10/1978 | Holloway et al. | 137/625.69 |
| 4,971,116 A | * | 11/1990 | Suzuki et al. | 137/625.65 |
| 5,186,204 A | * | 2/1993 | Oka et al. | 137/238 |
| 5,848,613 A | * | 12/1998 | Sakaguchi et al. | 137/625.65 |
| 5,868,167 A | * | 2/1999 | Miki et al. | 137/625.65 |
| 6,179,005 B1 | * | 1/2001 | Inami | 137/625.65 |
| 6,615,868 B1 | * | 9/2003 | Ueki | 137/625.3 |
| 6,676,105 B1 | * | 1/2004 | Dayton et al. | 251/54 |
| 6,776,191 B1 | * | 8/2004 | Nakamura et al. | 137/625.69 |
| 2002/0134443 A1 | * | 9/2002 | Sudani et al. | 137/625.65 |

* cited by examiner

*Primary Examiner*—Eric Keasel
*Assistant Examiner*—Craig Schneider
(74) *Attorney, Agent, or Firm*—Arent Fox PLLC (57) ABSTRACT

A normally open hydraulic control valve includes: a linear solenoid unit; a spool driven by an output force of the linear solenoid unit to move forward; a valve body in which the spool is fitted; and a return spring for biasing the spool in a retreating direction. The valve body includes: a reaction force oil chamber for introducing hydraulic pressure, which presses the spool in a direction against a biasing force of the return spring, from the output port; and a damper oil chamber which suppresses vibration of the spool. The damper oil chamber is adjacent to the reaction force oil chamber with the third land portion of the spool therebetween. A slide gap which leaks and supplies oil from the reaction force oil chamber to the damper oil chamber is provided between the third land portion and the valve body. Thus, it is possible to quickly supply the oil to the damper oil chamber at the early stage of the operation without restriction on the arrangement, and to prevent delay in operation of the damper oil chamber.

13 Claims, 7 Drawing Sheets

PRIOR ART

FIG.8

NORMALLY OPEN HYDRAULIC CONTROL VALVE

BACKGROUND OF THE INVENTION

1. Field of the Invention

The present invention relates to improvement of a normally open hydraulic control valve comprising: a linear solenoid unit; a spool driven by an output force of the linear solenoid unit to move forward; a valve body in which the spool is slidably fitted; and a return spring for biasing the spool in a retreating direction, the valve body including: a supply port leading to a hydraulic pressure source; an output port leading to a hydraulic pressure operating unit; a drain port opened into an oil tank; a reaction force oil chamber for introducing hydraulic pressure, which presses the spool in a direction against a biasing force of the return spring, from the output port; and a damper oil chamber to which one end surface of the spool is faced and which suppresses vibration of the spool, the spool being constructed to provide blockage between the output port and the drain port at a retreat limit of the spool to provide communication between the supply port and the output port, and to provide blockage between the supply port and the output port by advance of the spool to provide communication between the output port and the drain port.

2. Description of the Related Art

Figure 8:
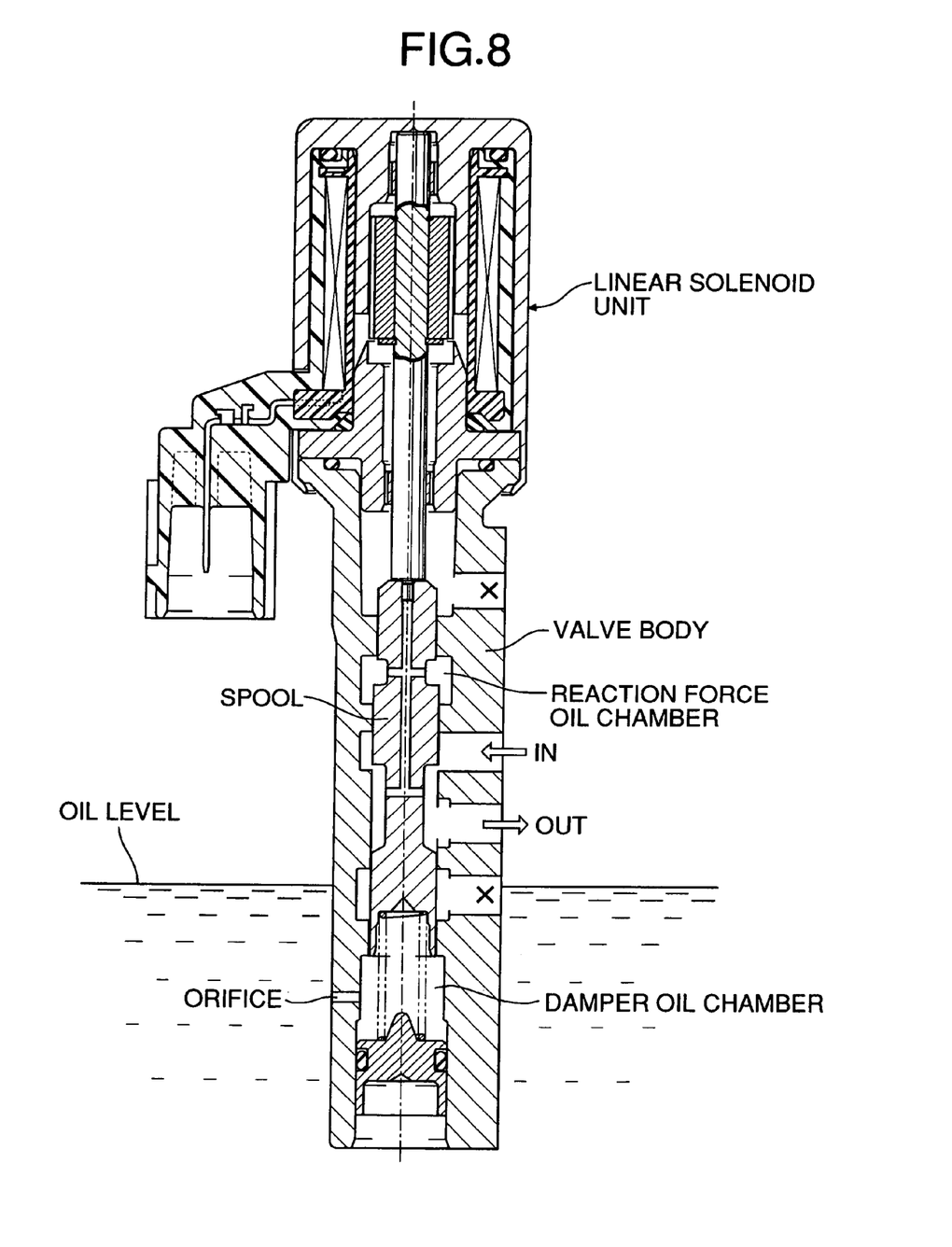
FIG. 8 is a longitudinal sectional view of a conventional normally open hydraulic control valve.

An example of such a conventional normally open hydraulic control valve is shown in FIG. 8. In this example, at least the tip end of the valve body, which is at the opposite side from the linear solenoid unit, is submerged in oil of the oil tank, and the damper oil chamber communicating with the oil via the orifice is provided in the valve body, so that the damper oil chamber is always filled with oil. When the spool vibrates, the vibration of the spool is suppressed by the throttle resistance of the orifice against the oil.

The conventional normally open hydraulic control valve as described above has a restriction on placement, that is, the damper oil chamber has to be submerged in the oil of the oil tank to fill the damper oil chamber with oil. In addition, the difference in level between the oil in the oil tank and the damper oil chamber is comparatively small, and therefore supply of the oil from the oil tank to the damper oil chamber by utilizing the difference lacks swiftness, thus causing a fear that a delay in operation of the damper oil chamber occurs at the early stage of the operation of the normally open hydraulic control valve.

SUMMARY OF THE INVENTION

The present invention has been achieved in view of the above circumstances, and has an object to provide a normally open hydraulic control valve which suffers no restriction on placement of an oil tank, which is capable of quickly supplying oil to a damper oil chamber at the early stage of the operation, and which does not cause a delay in operation of the damper oil chamber.

In order to attain the above-described object, according to a first feature of the present invention, there is provided a normally open hydraulic control valve comprising: a linear solenoid unit; a spool driven by an output force of the linear solenoid unit to move forward; a valve body in which the spool is slidably fitted; and a return spring for biasing the spool in a retreating direction, the valve body including: a supply port leading to a hydraulic pressure source; an output port leading to a hydraulic pressure operating unit; a drain port opened into an oil tank; a reaction force oil chamber for introducing hydraulic pressure, which presses the spool in a direction against a biasing force of the return spring, from the output port; and a damper oil chamber to which one end surface of the spool is faced and which suppresses vibration of the spool, the spool being constructed to provide blockage between the output port and the drain port at a retreat limit of the spool to provide communication between the supply port and the output port, and to provide blockage between the supply port and the output port by advance of the spool to provide communication between the output port and the drain port, wherein a first land portion which slides in the valve body to provide blockage/communication between the supply port and the output port in accordance with advance/retreat of the spool, a second land portion which slides in the valve body to provide communication/blockage between the output port and the drain port in accordance with the advance/retreat of the spool, and a third land portion which has a diameter larger than that of the second land portion and slides in the valve body are formed on the spool in order from a side of the linear solenoid unit, wherein the valve body further includes a reaction force oil chamber to which a border portion of the second and third land portions is faced and which communicates with the output port, and a damper oil chamber adjacent to the reaction force oil chamber with the third land portion therebetween, and wherein a slide gap which leaks and supplies oil from the reaction force oil chamber to the damper oil chamber is provided between the third land portion and the valve body.

The hydraulic pressure source corresponds to a hydraulic pump 42 in the embodiments of the present invention which will be described later.

In addition to the first feature, according to a second feature of the present invention, the third land portion is provided with aligning means which receives the hydraulic pressure of the reaction force oil chamber and gives an aligning force to the third land portion.

The aligning means of the present invention corresponds to a taper surface $25_{3b}$ and a reduced diameter cylindrical surface $25_{3c}$ in the embodiments of the present invention which will be described later.

In addition to the second feature, according to a third feature of the present invention, the first land portion is provided with aligning means which receives hydraulic pressure of the supply port and gives an aligning force to the first land portion.

The aligning means corresponds to a taper surface $25_{1b}$ in the embodiments of the present invention which will be described later.

In addition to the second feature, according to a fourth feature of the present invention, the second land portion is provided with aligning means which receives hydraulic pressure of the reaction force oil chamber and gives an aligning force to the second land portion.

The aligning means corresponds to a taper surface $25_{2b}$ in the embodiments of the present invention which will be described later.

In addition to the second feature, according to a fifth feature the present invention, the first land portion is provided with aligning means which receives hydraulic pressure of the supply port and gives an aligning force to the first land portion, and the second land portion is provided with aligning means which receives hydraulic pressure of the reaction force oil chamber and gives an aligning force to the second land portion.

The aligning means of the first and second land portions respectively correspond to the taper surfaces $25_{1b}$ and $25_{2b}$ in the embodiments of the present invention which will be described later.

In addition to any one of the second to fifth features, according to a sixth feature of the present invention, the aligning means is constructed by a taper surface which is formed on a part of an outer peripheral surface of the corresponding land portion and receives hydraulic pressure on an entire peripheral surface.

In addition to any one of the second to fifth features, according to a seventh feature of the present invention, the aligning means is constructed by a reduced diameter cylindrical surface which is formed on a part of an outer peripheral surface of each of the land portions and receives hydraulic pressure on an entire peripheral surface.

With the first feature of the present invention, the supply port is normally opened, and therefore when the hydraulic pump is operated, the generated hydraulic pressure is immediately supplied to the reaction force oil chamber, and positively leaked and supplied to the adjacent damper oil chamber via the slide gap between the third land portion and the valve body. Accordingly, the damper oil chamber can be filled with oil without a delay from the early stage of the operation of the hydraulic control valve, and therefore the damper oil chamber can always exhibit a good vibration suppressing function for the spool. In addition, it is not necessary to submerge the damper chamber in the oil of the oil tank as in the prior art, and therefore there is no restriction on placement in the normally open hydraulic control valve, thus enhancing general versatility.

With the second feature of the present invention, the slide gap between the third land portion and the valve body is comparatively large. Therefore, even when the third land portion is moved sideways by receiving side thrust due to the leak oil passing through the slide gap, the aligning means receives the hydraulic pressure of the reaction force oil chamber and gives the aligning force to the third land portion, thereby ensuring smooth slide of the third land portion to the valve body.

With the third feature of the present invention, even when the first land portion is moved sideways by receiving side thrust for some reason, the aligning means receives the hydraulic pressure of the supply port and gives the aligning force to the first land portion, thereby ensuring smooth slide of the spool to the valve body, while the third land portion is also given the aligning force.

With the fourth feature of the present invention, even when the second land portion is moved sideways by receiving side thrust for some reason, the aligning means receives the hydraulic pressure of the reaction force oil chamber and gives the aligning force to the second land portion, thereby ensuring smooth slide of the spool to the valve body, while the third land portion is also given the aligning force.

With the fifth feature of the present invention, the first to the third land portions are all given the aligning force by the hydraulic pressure, thereby ensuring smooth slide of the spool to the valve body.

With the sixth feature of the present invention, even when the land portion is moved sideways by side thrust, the taper surface receives the hydraulic pressure on its entire peripheral surface without contacting the inner peripheral surface of the valve body, thereby giving the aligning force to the land portion. Accordingly, the aligning means can be constructed with such an extremely simple structure that the taper surface is provided on the outer peripheral surface of the land portion.

With the seventh feature of the present invention, even when the land portion is moved sideways by side thrust, the reduced diameter cylindrical surface receives the hydraulic pressure on its entire surface without contacting the inner peripheral surface of the valve body, thereby giving the aligning force to the land portion. Accordingly, the aligning means can be constructed by such an extremely simple structure that the reduced diameter cylindrical surface is provided on the outer peripheral surface of the land portion. In addition, this reduced diameter cylindrical surface is easier to be machined than the taper surface.

DESCRIPTION OF THE PREFERRED EMBODIMENTS

The above-mentioned object, other objects, features, and advantages of the present invention will become clear from the detailed description of a preferred embodiment with reference to the accompanying drawings.

The first embodiment of the present invention shown in FIG. 1 to FIG. 4 will be explained.

Figure 1:
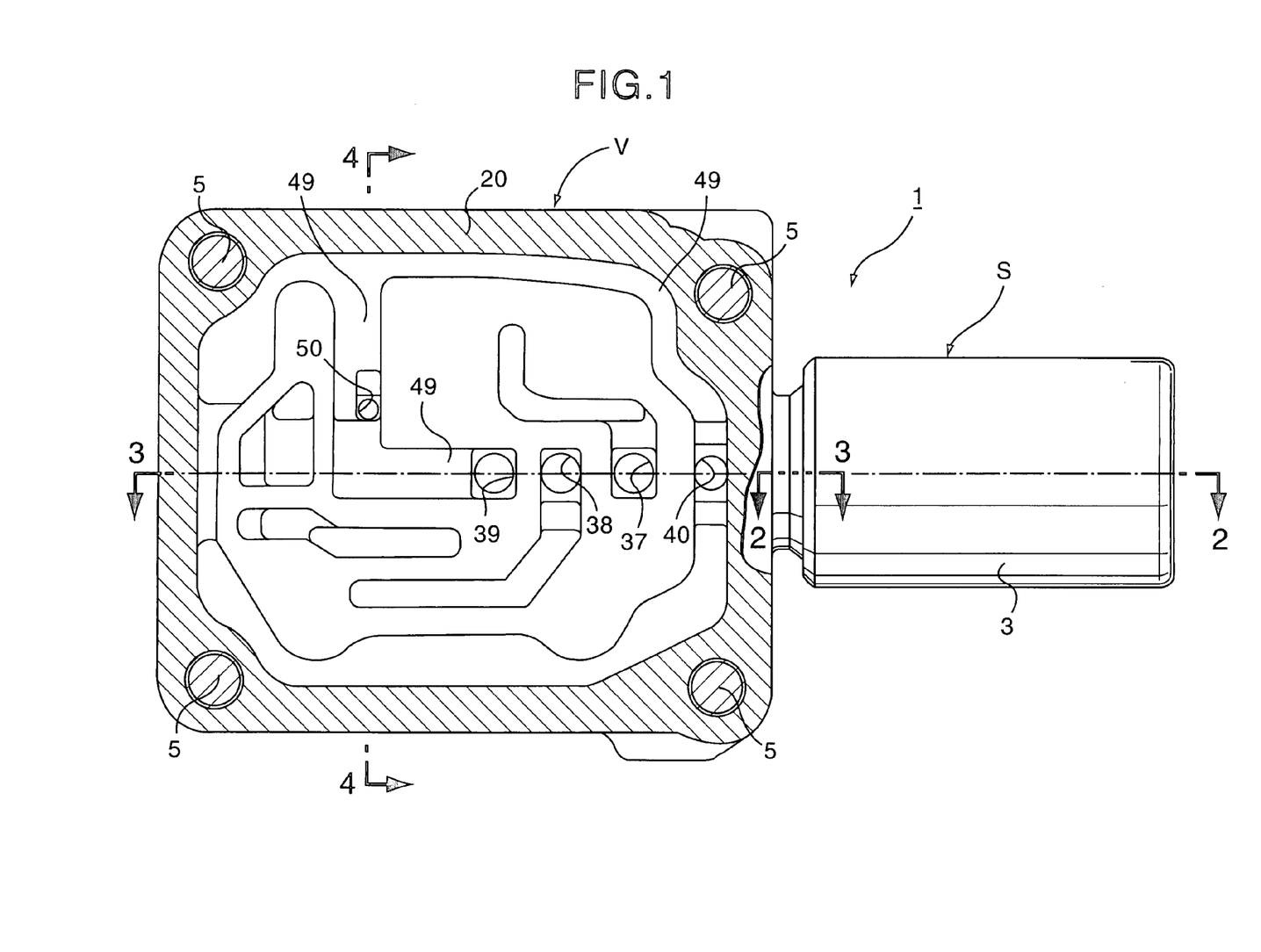
FIG. 1 is a bottom view of a normally open hydraulic control valve according to a first embodiment of the present invention.

Referring to FIG. 1, a hydraulic control valve 1 is for controlling clutch hydraulic pressure in, for example, an automatic transmission for an automobile, and is constituted of a linear solenoid unit S and a valve unit V. A valve body 20 of the valve unit V is joined with a bolt 5 to a top surface 2a of a transmission case 2 (see FIG. 4) of an automobile.

Figure 2:
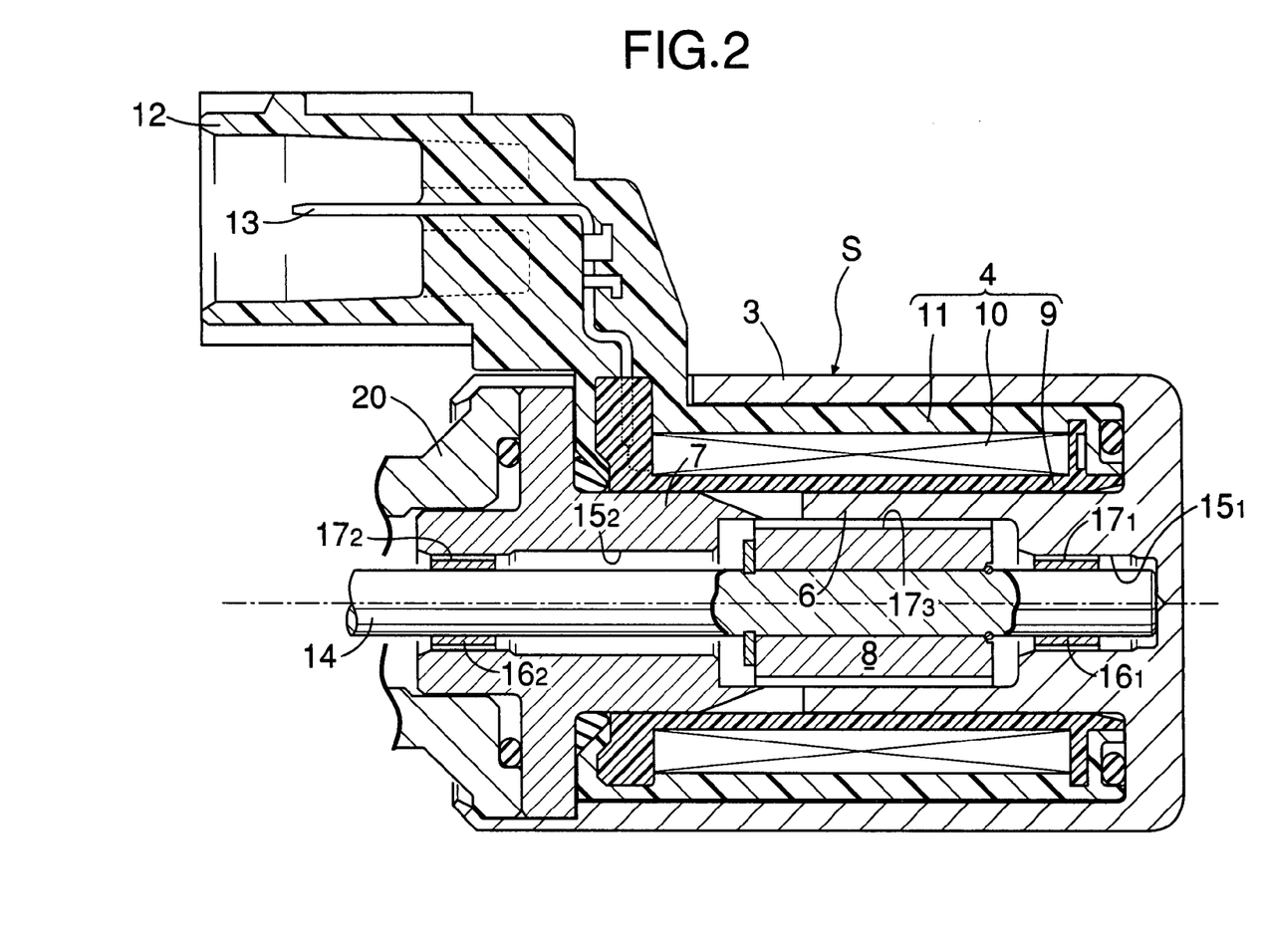
FIG. 2 is an enlarged sectional view taken along the line 2—2 in FIG. 1.

As shown in FIG. 2, the linear solenoid unit S includes: a housing 3 made of a magnetic material in a bottomed cylindrical shape with one end opened; a coil assembly 4 housed in this housing 3; a cylindrical yoke 6 integrally connected to a closed end wall of the housing 3 and placed inside the coil assembly 4; a fixed core 7 connected to the open end of the housing 3, and placed inside the coil assembly 4 to oppose to the yoke 6 with a predetermined space from the yoke 6; and a movable core 8 slidably fitted in the yoke 6 and the fixed core 7. The coil assembly 4 is constituted of a bobbin 9 made of a synthetic resin, a coil 10 which is wound around the bobbin 9, and a coil case 11 made of a synthetic resin formed to house the bobbin 9 and the coil 10. A coupler 12 protruding outside the housing 3 is integrally connected to one end portion of the coil case 11, and a connecting terminal 13 leading to the coil 10 is placed in the coupler 12.

An opposing surface of the yoke 6 to the fixed core 7 is formed perpendicularly to the axis of the yoke 6. An opposing surface of the fixed core 7 to the yoke 6 is formed into a conical shape.

An output rod 14 penetrating through a central portion of the movable core 8 is fixed to the movable core 8. One end portion of this output rod 14 is slidably supported in a bag-shaped first bearing hole $15_1$ provided in the closed end wall of the housing 3 via a first bush $16_1$. The other end portion of the output rod 14 is slidably supported in a second bearing hole $15_2$, which penetrates through a central portion of the fixed core 7, via a second bush $16_2$.

Thus, an electromagnetic thrust force proportional to a current value passing through the coil 10 can be applied to the output rod 14 via the movable core 8.

The first bush $16_1$ is fixed to an inner peripheral surface of the first bearing hole $15_1$ by press fitting. A first communication groove $17_1$ is provided in the axial direction on an outer peripheral surface of the first bush $16_1$ to provide communication between its opposite ends surfaces. A second bush $16_2$ is fixed to an inner peripheral surface of the second bearing hole $15_2$ by press fitting. A second communication groove $17_2$ is also provided in the axial direction on an outer peripheral surface of this second bush $16_2$ to provide communication between its opposite ends surfaces. A third communication groove $17_3$ is provided in the axial direction on an outer peripheral surface of the movable core 8 to provide communication between its end surfaces of the movable core 8.

Figure 3:
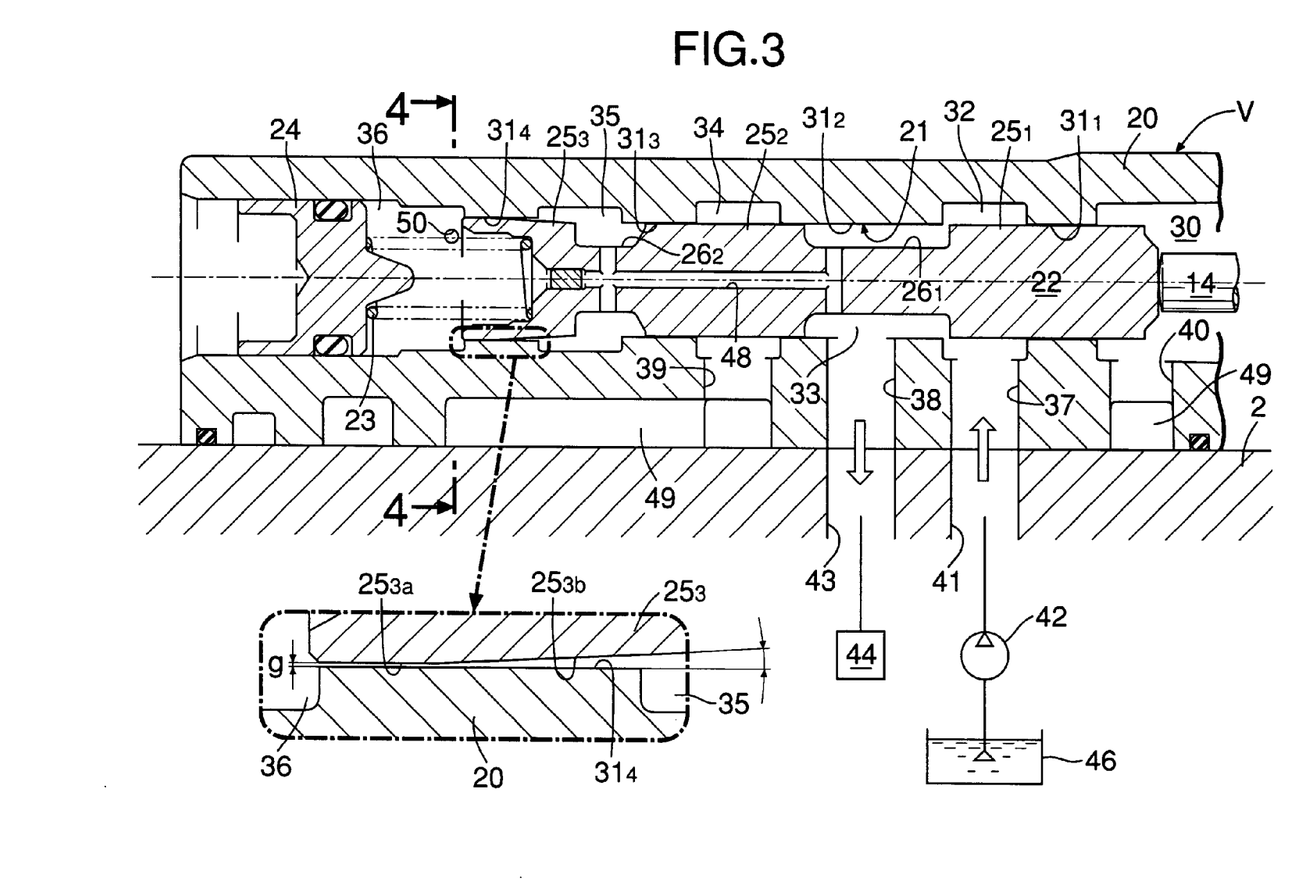
FIG. 3 is an enlarged sectional view taken along the line 3—3 in FIG. 1.

Next, as shown in FIG. 3, the valve unit V is constructed by a valve body 20 connected by crimping to the housing 3 at the side of the fixed core 7, a spool 22 which is fitted into a valve hole 21 formed in this valve body 20 coaxially with the output rod 14 and abuts to a front end of the output rod 14, a return spring 23 for biasing this spool 22 in its retreating direction, namely, in a direction to abut to the output rod 14, and a plug 24 which is press-fitted into the valve body 20 and supports an outer end of the return spring 23. A set load of the return spring 23 is adjusted in accordance with press fitting depth of the plug 24 into the valve body 20.

The spool 22 is provided with a first land portion $25_1$, a first annular groove portion $26_1$, a second land portion $25_2$, a second annular groove portion $26_2$ and a third land portion $25_3$ in order from the side of the linear solenoid unit S. The first and the second land portions $25_1$ and $25_2$ are formed to have the same diameter, and the third land portion $25_3$ is formed to have a diameter slightly larger than that of the second land portion $25_2$.

Meanwhile, the valve hole 21 of the valve body 20 is provided with an operating chamber 30 which the abutting portion of the output rod 14 and the spool 22 faces, a first annular land portion $31_1$ which is adjacent to this operating chamber 30 and to which the first land portion $25_1$ is always slidably fitted, a second annular land portion $31_2$ which the opposing end portions of the first land portion $25_1$ and the second land portion $25_2$ are alternately fitted to and separated from, a third annular land portion $31_3$ to which the second land portion $25_2$ is always slidably fitted, a fourth annular land portion $31_4$ to which the third land portion $25_3$ is always slidably fitted, a supply oil chamber 32 placed to be sandwiched between the first and the second annular land portions $31_1$ and $31_2$, an output oil chamber 33 which is placed inside the second annular land portion $31_2$ to be sandwiched between the first and the second land portions $25_1$ and $25_2$ of the spool 22, a drain oil chamber 34 which is placed to be sandwiched between the second and the third annular land portions $31_2$ and $31_3$, a reaction force oil chamber 35 which a border portion of the third and the fourth annular land portions $31_3$ and $31_4$ including the second annular groove portion $26_2$ faces, and a damper oil chamber 36 which both opposite ends surfaces of the spool 22 and the plug 24 face. The return spring 23 is housed in this damper oil chamber 36.

An outer peripheral surface of the third land portion $25_3$ is constructed by a cylindrical slide surface $25_{3a}$ which is fitted to the fourth annular land portion $31_4$, and a taper surface $25_{3b}$ which has a diameter decreasing from the cylindrical slide surface $25_{3a}$ to the reaction force oil chamber 35. A slide gap g which can leak and supply oil to the damper oil chamber 36 from the reaction force oil chamber 35 is provided between the cylindrical slide surface $25_{3a}$ of the third land portion $25_3$ and the fourth annular land portion $31_4$.

The valve body 20 is further provided with a supply port 37 continuing into the supply oil chamber 32, an output port 38 continuing into the output oil chamber 33, a drain port 39 continuing into the drain oil chamber 34, and a breather port 40 continuing into the operating chamber 30. The supply port 37 is connected to a hydraulic pump 42 as a hydraulic pressure source via a supply oil passage 41 of the transmission case 2. The output port 38 is connected to an output oil passage 43 directly leading to a hydraulic operating portion 44 such as a clutch for automatic transmission. The drain port 39 and the breather port 40 are opened into an oil reservoir chamber 49 (see FIG. 1 and FIG. 4), which will be described later, inside the valve body 20. The hydraulic pump 42 is driven by an engine not shown.

The output oil chamber 33 communicates with the reaction force oil chamber 35 via a feedback oil passage 48 formed in the spool 22.

Thus, if the spool 22 is held at the retreated position by the biasing force of the return spring 23 when the linear solenoid unit S is not energized, the spool 22 provides communication between the supply port 37 and the output port 38. That is, the hydraulic control valve 1 is of a normally open type.

Figure 4:
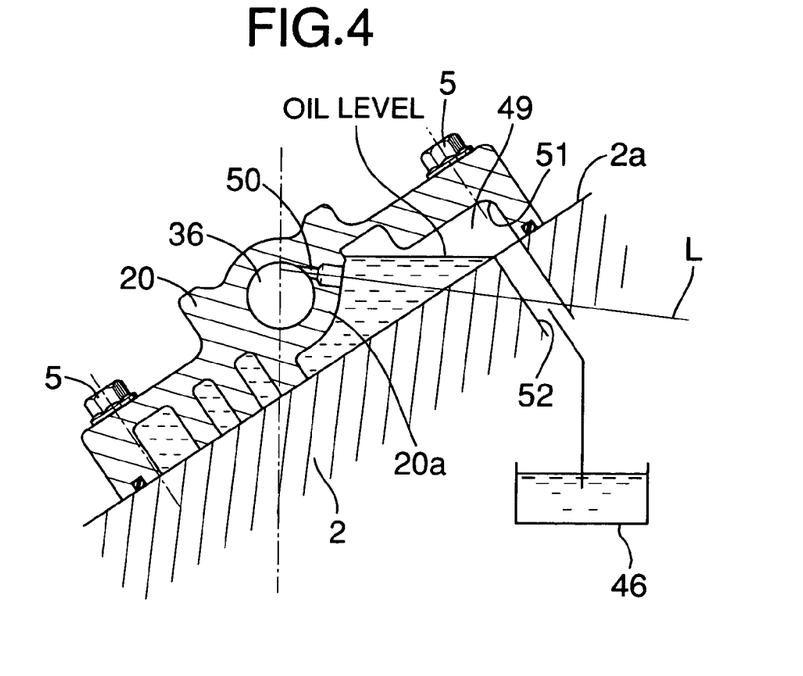
FIG. 4 is a sectional view taken along the line 4—4 in FIG. 1.

As shown in FIG. 1 and FIG. 4, the valve body 20 is provided with the oil reservoir chamber 49 around the damper oil chamber 36. The oil reservoir chamber 49 is defined by closing a downward opening of a recessed portion 51 formed in an undersurface of the valve body 20 with the top surface 2a of the transmission case 2 to which the valve body 20 is joined. An uppermost portion of the damper oil chamber 36 is allowed to communicate with the oil reservoir chamber 49 via an orifice 50, so that the oil discharged from the damper oil chamber 36 through the orifice 50 is stored in the oil reservoir chamber 49.

The orifice 50 is worked by drilling in a partition wall 20a between the damper oil chamber 36 and the oil reservoir chamber 49 at an angle diagonally upward from the opening of the recessed portion 51, before the valve body 20 is joined to the transmission case 2. In order to make the drilling work possible, an axis L of the orifice 50 is disposed to pass through the opening of the recessed portion 51.

FIG. 4 shows a normal mounting posture of the valve body 20 onto the transmission case 2. Namely, the valve body 20 is mounted on the inclined top surface 2a of the transmission case 2 so that a ceiling surface of the oil reservoir chamber 49 is located above the orifice 50. Such a mounting posture of the valve body 20 is preferable, because the orifice 50, which is diagonally worked by drilling from the side of the open surface of the recessed portion 51, is brought into a substantially horizontal state, and air bubbles can be smoothly discharged to the oil reservoir chamber 49 from the damper oil chamber 36.

The transmission case 2 is provided with a drain oil hole 52 which opens the oil reservoir chamber 49 into the oil tank 46 to keep the oil reservoir chamber 49 under atmospheric pressure. In this case, the opening of the drain oil hole 52 to the oil reservoir chamber 49 is placed above the orifice 50 so that the oil, which moves into the oil reservoir chamber 49 from the orifice 50, is discharged to the drain passage 52 after the oil is stored sufficiently in the oil reservoir chamber 49 to submerge the orifice 50 in the oil.

Next, an operation of the first embodiment will be explained.

When the linear solenoid unit S is not energized, the spool 22 is located at a rightward movement limit position (retreat limit) by the biasing force of the return spring 23 as shown in FIG. 3, so that the spool 22 provides communication between the supply port 37 and the output port 38, and provides blockage between the output port 38 and the drain port 39. Therefore, when the hydraulic pump 42 is driven by the engine to generate hydraulic pressure, the hydraulic pressure is transmitted to the reaction force oil chamber 35 through the supply oil passage 41, the supply port 37 and the feed back oil passage 48. Then, in this reaction force oil chamber 35, the leftward thrust force with the magnitude, which is obtained by multiplying the hydraulic pressure by the area difference of the opposing end surfaces between the second land portion $25_2$ with the small diameter and the third land portion $25_3$ with the large diameter of the spool 22, acts on the spool 22, as the reaction force to resist the biasing force of the return spring 23.

On the other hand, when the coil 10 of the linear solenoid unit S is. energized, the electromagnetic force corresponding to the current value acts on the spool 22 via the output rod 14 as the leftward thrust force. As a result, the spool 22 moves to a position where the three forces, that is, the leftward thrust force generated in the reaction force oil chamber 35, the leftward thrust force by the electromagnetic force and the rightward thrust force by the return sprint 23 are balanced, and controls the opening degree of the supply port 37. Namely, when the combined leftward thrust force is larger than the rightward thrust force, the spool 22 advances leftward, so that the first land portion $25_1$ provides blockage between the supply port 37 and the output port 38, and the second land portion $25_2$ provides communication between the output port 38 and the drain port 39. Therefore, the hydraulic pressure of the output port 38 decreases. On the other hand, when the rightward thrust force becomes larger than the leftward composite thrust force, the spool 22 advances rightward, so that the second land portion $25_2$ provides blockage between the output port 38 and the drain port 39, and the first land portion $25_1$ provides communication between the supply port 37 and the output port 38. Therefore, the hydraulic pressure of the output port 38 increases. Since the opening degree of the output port 38 is controlled as described above, the hydraulic pressure corresponding to the value of the current applied to the coil 10 is taken out of the output port 38, and supplied to the hydraulic pressure operating unit 44.

The hydraulic control valve 1 is a normally open type in which the supply port 37 is normally opened, and therefore, when the hydraulic pump 42 operates, the generated hydraulic pressure is instantly supplied to the reaction force oil chamber 35 as described above. In addition, the reaction force oil chamber 35 and the damper oil chamber 36 adjacent thereto communicate with each other via the slide gap g between the third land portion $25_3$ and the fourth annular land portion $31_4$. Therefore, when the hydraulic pressure is supplied to the reaction force oil chamber 35, oil immediately leaks from the reaction force oil chamber 35 to the damper oil chamber 36, to fill the damper oil chamber 36 with oil. Accordingly, the damper oil chamber 36 can function normally without a delay from the early stage of the operation of the hydraulic control valve 1. Namely, when the spool 22 vibrates, the vibration of the spool 22 can be suppressed by the throttle resistance of the orifice 50, which occurs when the oil of the damper oil chamber 36 moves to and from the orifice 50 following the vibration of the spool 22. Therefore, the pulsation of the output hydraulic pressure due to the vibration of the spool 22 is prevented to ensure a stable operation state of the hydraulic operating unit 44.

When the damper oil chamber 36 is filled with the leak oil from the reaction force oil chamber 35, the surplus oil is discharged from the orifice 50 into the adjacent oil reservoir chamber 49 to be stored therein. When the oil level of the oil reservoir chamber 49 reaches a predetermined level at which the orifice 50 is submerged under the oil level, the oil overflows through the drain oil hole 52 to return to the oil tank 46.

As described above, the leak oil is positively supplied to the damper oil chamber 36 from the reaction force oil chamber 35, and the orifice 50 is submerged in the oil which is discharged into and stored in the oil reservoir chamber 49 through the orifice 50. Therefore, the damper oil chamber 36 is always reliably filled with oil, and the favorable vibration suppressing function of the damper oil chamber 36 can be obtained. Accordingly, it is not necessary to submerge the damper oil chamber 36 in the oil of the oil tank as in the prior art, thereby eliminating the restriction on the arrangement of the normally open hydraulic control valve to enhance general versatility.

Since the orifice 50 is opened to the uppermost portion of the damper oil chamber 36, the air bubbles generating in the damper oil chamber 36 and the oil can be quickly discharged to the oil reservoir chamber 49 through the orifice 50, and thus better vibration suppressing function of the damper oil chamber 36 can be obtained.

Incidentally, the axis L of the orifice 50 is disposed to pass through the downward opening of the recessed portion 51 of the valve body 20, and therefore the orifice 50 can be worked by drilling in the partition wall 20a between the damper oil chamber 36 and the oil reservoir chamber 49 without interference by the outer wall of the oil reservoir chamber 46. Since a castoff hole is not required, a closing plug for closing the castoff hole as in the prior art is not required after the drilling work, thus contributing to reduction in the cost.

Meanwhile, the outer peripheral surface of the third land portion $25_3$ is constructed by a cylindrical slide surface $25_{3a}$ which fitted to the fourth annular land portion $31_4$, and the taper surface $25_{3b}$ which becomes smaller in diameter toward the reaction force oil chamber 35 from the cylindrical slide surface $25_{3a}$, as mentioned above. Therefore, even when the third land portion $25_3$ receives side thrust and is moved to one side of the fourth annular land portion $31_4$ by leak oil passing through the slide gap g between the third land portion $25_3$ and the fourth annular land portion $31_4$, one side portion of the cylindrical slide surface $25_{3a}$ abuts to the inner peripheral surface of the fourth annular land portion $31_4$, but the taper surface $25_{3b}$ does not contact the fourth annular land portion $31_4$ over the entire circumference. Accordingly, the hydraulic pressure of the reaction force oil chamber 35 acts on the entire peripheral surface of the taper surface $25_{3b}$ to give an aligning force to the third land portion $25_3$, thereby ensuring smooth slide of the third land portion $25_3$ with respect to the fourth annular land portion $31_4$.

Figure 5:
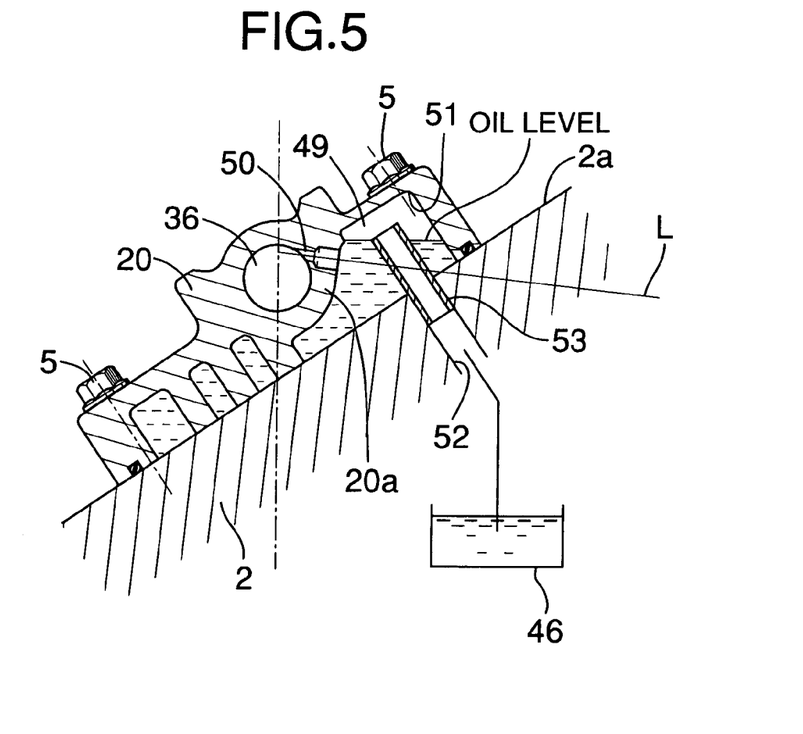
FIG. 5 is a view corresponding to FIG. 4, showing a second embodiment of the present invention.

Next, a second embodiment of the present invention shown in FIG. 5 will be explained.

In the second embodiment, the oil reservoir chamber 49 is constructed to be compact, and a drain pipe 53, which rises at the drain oil hole 52 and extends to a position above the orifice 50, is mounted in the transmission case 2. The other parts of construction are the same as in the previous embodiment, and therefore the parts corresponding to the previous embodiment are given the identical reference numerals and characters in FIG. 5, and the explanation of them will be omitted.

According to the second embodiment, the oil stored in the oil reservoir chamber 49 does not overflow unless the oil level reaches the upper end of the drain pipe 53, which is located at the position above the orifice 50. Therefore, the orifice 50 can be submerged in the oil of the oil reservoir chamber 49, though the oil reservoir chamber 49 is constructed to be compact.

Figure 6:
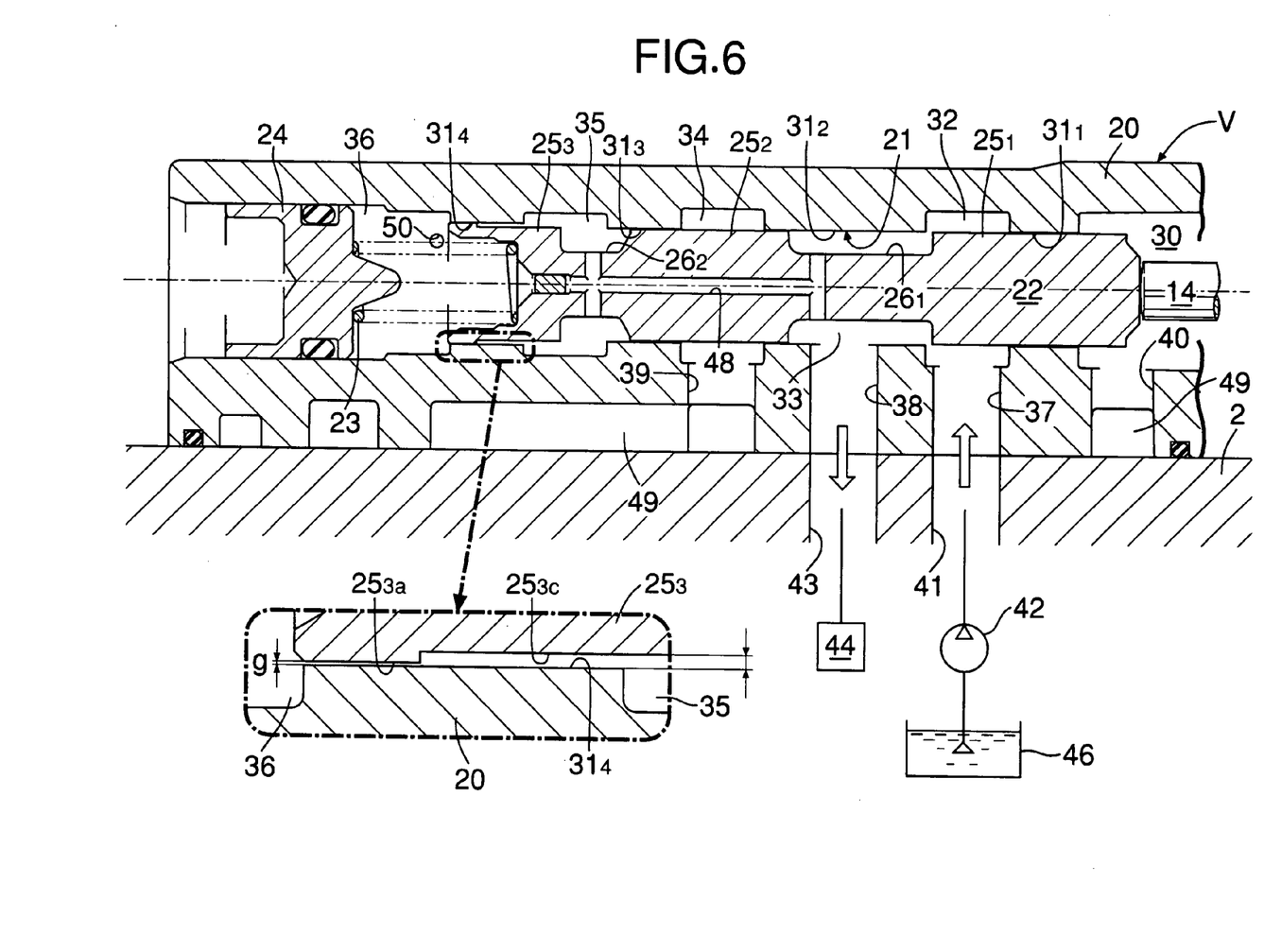
FIG. 6 is a view corresponding to FIG. 3, showing a third embodiment of the present invention.

Next, a third embodiment of the present invention shown in FIG. 6 will be explained.

In the third embodiment, the outer peripheral surface of the third land portion $25_3$ is constructed by connecting a reduced diameter cylindrical surface $25_{3c}$, which is in place of the taper surface $25_{3b}$ of the first embodiment, to the cylindrical slide surface $25_{3a}$ via an annular step portion. Since the other parts of construction are the same as in the first embodiment, the parts corresponding to the first embodiment are given the identical reference numerals and characters in FIG. 6, and the explanation of them will be omitted.

Also in the third embodiment, even when the third land portion $25_3$ receives side thrust for some reason and is moved to one side of the fourth annular land portion $31_4$, one side portion of the cylindrical slide surface $25_{3a}$ abuts to the inner peripheral surface of the fourth annular land portion $31_4$, but the reduced diameter cylindrical surface $25_{3c}$ does not contact the fourth annular land portion $31_4$ over the entire circumference. Accordingly, the hydraulic pressure of the reaction force oil chamber 35 acts on the entire peripheral surface of the reduced diameter cylindrical surface $25_{3c}$ to give the aligning force to the third land portion $25_3$, thus ensuring smooth slide of the third land portion $25_3$ with respect to the fourth annular land portion $31_4$. The reduced diameter cylindrical surface $25_{3c}$ has an advantage in being easier to work than the taper surface $25_{3b}$ of the first embodiment.

Figure 7:
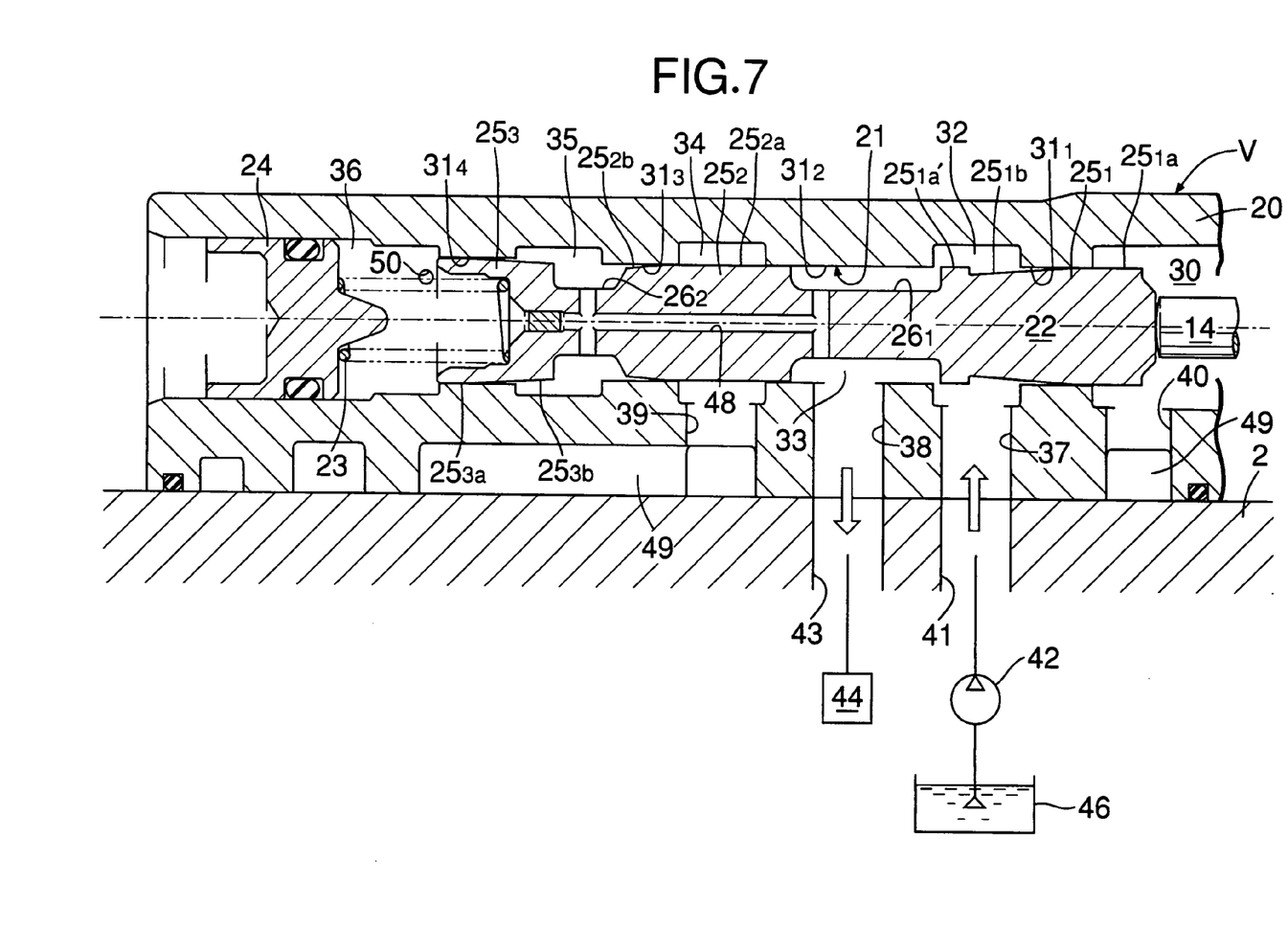
FIG. 7 is a view corresponding to FIG. 3, showing a fourth embodiment of the present invention.

Finally, a fourth embodiment of the present invention shown in FIG. 7 will be explained.

In the fourth embodiment, while forming the cylindrical slide surface $25_{1a}$ fitted to the first annular land portion $31_1$ and a cylindrical slide surface $25_{1a}$, which is fitted to and separated from the second annular land portion $31_2$, a taper surface $25_{1b}$ which becomes smaller in diameter toward the cylindrical slide surface $25_{1a}$, is formed on the outer peripheral surface of the first land portion $25_1$. Also in the second land portion $25_2$, a taper surface $25_{2b}$, which becomes smaller in diameter toward the reaction force oil chamber 35, is formed at the end portion at the side of the reaction force oil chamber 35, while forming the cylindrical slide surface $25_{2a}$, which is fitted to the second and the third annular land portions $25_2$ and $25_3$. Since the other parts of construction are the same as that in the first embodiment, the parts corresponding to the second embodiment are given the identical reference numerals and characters in FIG. 7, and the explanation of them will be omitted. In short, in the fourth embodiment, the taper surfaces $25_{1b}$ to $25_{3b}$ are formed on the outer peripheral surfaces of the first to the third land portion $25_1$ to $25_3$.

Accordingly, the hydraulic pressure introduced into the supply oil chamber 32 from the supply port 37 acts on the taper surface $25_{1b}$ of the first land portion $25_1$, and therefore the aligning force acts on the first land portion $25_1$. The hydraulic pressure of the reaction force oil chamber 35 acts on the taper surface $25_{2b}$ of the second land portion $25_2$ as in the taper surface $25_{3b}$ of the third land portion $25_3$, and therefore the aligning force also acts on the second land portion $25_2$. Thus, the aligning force is applied to all the land portions $25_1$ to $25_3$, thereby ensuring a smooth slide state of the spool 22.

The present invention is not limited to the above-described embodiments and modifications, and various design changes may be made without departing from the subject matter of the present invention. For example, the present invention is applicable to a normally closed hydraulic control valve. Oil can be supplied to the damper oil chamber 49 also from the drain port 36.

What is claimed is:

1. A normally open hydraulic control valve comprising:
   a linear solenoid unit;
   a spool driven by an output force of the linear solenoid unit to move forward;
   a valve body in which the spool is slidably fitted; and
   a return spring for biasing the spool in a retreating direction, the valve body including:
   a supply port leading to a hydraulic pressure source;
   an output port leading to a hydraulic pressure operating unit;
   a drain port opened into an oil tank;
   a reaction force oil chamber for introducing hydraulic pressure, which presses the spool in a direction against a biasing force of the return spring, from the output port; and
   a damper oil chamber to which one end surface of the spool is faced and which suppresses vibration of the spool,
   the spool being constructed to provide blockage between the output port and the drain port at a retreat limit of the spool to provide communication between the supply port and the output port, and to provide blockage between the supply port and the output port by advance of the spool to provide communication between the output port and the drain port,
   wherein a first land portion which slides in the valve body to provide blockage/communication between the supply port and the output port in accordance with advance/retreat of the spool, a second land portion which slides in the valve body to provide communication/blockage between the output port and the drain port in accordance with the advance/retreat of the spool, and a third land portion which has a diameter larger than that of the second land portion and slides in the valve body are formed on the spool in order from a side of the linear solenoid unit,
   wherein the valve body further includes a reaction force oil chamber to which a border portion of the second and third land portions is faced and which communicates with the output port, and a damper oil chamber adjacent to the reaction force oil chamber with the third land portion therebetween, and
   wherein a slide gap which leaks and supplies oil from the reaction force oil chamber to the damper oil chamber is provided between the third land portion and the valve body.

2. The normally open hydraulic control valve according to claim 1, wherein the third land portion is provided with aligning means which receives the hydraulic pressure of the reaction force oil chamber and gives an aligning force to the third land portion.

3. The normally open hydraulic control valve according to claim 2, wherein the first land portion is provided with aligning means which receives hydraulic pressure of the supply port and gives an aligning force to the first land portion.

4. The normally open hydraulic control valve according to claim 3, wherein the aligning means is constructed by a taper surface which is formed on a part of an outer peripheral surface of the corresponding land portion and receives hydraulic pressure on an entire peripheral surface.

5. The normally open hydraulic control valve according to claim 3, wherein the aligning means is constructed by a reduced diameter cylindrical surface which is formed on a part of an outer peripheral surface of each of the land portions and receives hydraulic pressure on an entire peripheral surface.

6. The normally open hydraulic control valve according to claim 2, wherein the aligning means is constructed by a taper surface which is formed on a part of an outer peripheral surface of the corresponding land portion and receives hydraulic pressure on an entire peripheral surface.

7. The normally open hydraulic control valve according to claim 2, wherein the second land portion is provided with aligning means which receives hydraulic pressure of the reaction force oil chamber and gives an aligning force to the second land portion.

8. The normally open hydraulic control valve according to claim 4, wherein the aligning means is constructed by a taper surface which is formed on a part of an outer peripheral surface of the corresponding land portion and receives hydraulic pressure on an entire peripheral surface.

9. The normally open hydraulic control valve according to claim 7, wherein the aligning means is constructed by a reduced diameter cylindrical surface which is formed on a part of an outer peripheral surface of each of the land portions and receives hydraulic pressure on an entire peripheral surface.

10. The normally open hydraulic control valve according to claim 2, wherein the aligning means is constructed by a reduced diameter cylindrical surface which is formed on a part of an outer peripheral surface of each of the land portions and receives hydraulic pressure on an entire peripheral surface.

11. The normally open hydraulic control valve according to claim 2, wherein the first land portion is provided with aligning means which receives hydraulic pressure of the supply port and gives an aligning force to the first land portion, and wherein the second land portion is provided with aligning means which receives hydraulic pressure of the reaction force oil chamber and gives an aligning force to the second land portion.

12. The normally open hydraulic control valve according to claim 11, wherein the aligning means is constructed by a taper surface which is formed on a part of an outer peripheral surface of the corresponding land portion and receives hydraulic pressure on an entire peripheral surface.

13. The normally open hydraulic control valve according to claim 11, wherein the aligning means is constructed by a reduced diameter cylindrical surface which is formed on a part of an outer peripheral surface of each of the land portions and receives hydraulic pressure on an entire peripheral surface.

* * * * *